Patented Apr. 27, 1943

2,317,353

UNITED STATES PATENT OFFICE 2,317,353

PURIFICATION OR CONCENTRATION OF TOCOPHEROL

James G. Baxter, Rochester, N. Y., assignor to Distillation Products, Inc., Rochester, N. Y., a corporation of Delaware No Drawing. Application August 31, 1940, Serial No. 355,088

7 Claims. (Cl. 260—338)

This application relates to an improved method for preparing tocopherol concentrates of increased purity.

Tocopherol occurs in three forms known as alpha, beta, and gamma tocopherol. They are of value because of their Vitamin E activity and because they are effective as anti-oxidants. Little work has been done on the properties of these substances, mainly because of the fact that they were not heretofore available in sufficiently large quantities and because of the difficulty of preparing them in relatively concentrated and stable form.

This invention has for its object to provide improved procedure for preparing purified and concentrated tocopherol. Another object is to provide simple procedure whereby impure tocopherol which contains impurities, such as naturally occur therewith, can be concentrated and purified. A still further object is to provide a process for preparing purified tocopherols and for removing impurities such as free fatty acids without concurrent destruction of the tocopherol. Another object is to provide simple and economical procedure for preparing a concentrate having sufficient tocopherol content that it can be converted directly into esters which can be crystallized with ease. Other objects will appear hereinafter.

These and other objects are accomplished in accordance with my invention which includes adding to a crude mixture containing tocopherol a lower aliphatic alcohol and a catalyst. This mixture is heated until the reaction between the alcohol and impurities is substantially complete. The excess alcohol and reaction products are then substantially completely separated from the tocopherol in the reaction mixture.

In the following description I have given several of the preferred embodiments of my invention. However, it is to be understood that these are set forth for the purpose of illustration and not in limitation thereof.

As starting material I may use tocopherol containing materials in general which contain impurities, or which are insufficiently concentrated. For instance, in Hickman application 321,913, filed March 2, 1940, it is disclosed that sludges, scums, and like by-products produced during steam deodorization and similar carrier gas treatment of vegetable oils, contain tocopherol. These scums and sludges are separated from the carrier gas in traps, condensers or the like. My invention is applicable to the purification and concentration of tocopherol contained in materials of this nature. However, the invention is of greatest value for treating partial concentrates produced from such sludges and scums. In the above-mentioned Hickman application it is disclosed that tocopherol may be prepared in concentrated form by subjecting these scums to high vacuum, unobstructed path distillation with separation of distillates containing tocopherol. This distillation procedure may be applied to scums which have been pretreated, such as with acids, alkalies, solvent, etc. In most cases these distillates contained substantial amounts of impurities and they can be satisfactorily removed by the procedure described in the present application. Tocopherol is also known to occur in natural vegetable and animal oils and in Hickman and Baxter application 233,496, filed October 5, 1938, there is described the removal of tocopherol from such oils by subjecting them to high vacuum, unobstructed path distillation. The distillates thus produced contain tocopherol in relatively concentrated condition but also undesirable impurities such as free fatty acids and the like. This material is also a suitable starting material for use in connection with my invention.

A lower aliphatic alcohol is added to the tocopherol material which is to be purified. By lower aliphatic alcohol I intend to designate those alcohols which contain less than 8 carbon atoms or derivatives thereof such as methyl, ethyl, normal propyl, isopropyl, and butyl alcohol. The amount of alcohol which is added can vary considerably and is in no way critical. I prefer to use about two volumes of alcohol to one of crude tocopherol starting material. However, larger or smaller amounts such as ½ volume to 10 volumes may be used if desired. No advantage is to be obtained by the use of substantially larger or smaller volumes, and the use of small amounts will usually slow the reaction. The alcohol usually should be present in amounts sufficient to at least react with free fatty acids or substances converted thereto and present in the crude material being treated. Materials of this type react with the alcohol to form corresponding esters which can be easily separated from the tocopherol by distillation. Any catalyst which promotes this type of reaction may be used. I prefer mineral acid catalysts, such as hydrochloric, sulfuric, or phosphoric because they do not have a deleterious action on the tocopherol. Other examples of satisfactory catalysts are chloro sulfonic and paratoluene sulfonic acids. The catalyst is added in amounts of about 1% of the mixture by weight. Smaller amounts such as .1% can be used, also larger amounts, but with no advantage.

The mixture of crude tocopherol, alcohol and catalyst is then heated until the reaction is substantially complete. The best method is to heat under gentle reflux at about the boiling point of the alcohol which was added to the mixture. Lower temperatures may be used and if desired the mixture can be heated under pressure at a temperature above the boiling point of the alcohol in order to complete the reaction in a shorter period of time. For all general purposes heating to the boiling point under reflux is quite satisfactory.

Although it is unnecessary to carry out the procedure in the presence of inert gas, this expedient may be used in order to protect the tocopherol against the destructive action of the oxygen in the air. However, I have found that this is unnecessary if reasonable precautions are taken to avoid unnecessary or prolonged contact with air. During the refluxing operation little air will find its way into the reflux condenser and then into the material being distilled. However, I prefer to add zinc dust or similar reducing agent to the mixture of tocopherol alcohol and catalyst in order to maintain the tocopherol in the hydroquinone form during the reaction and thus prevent oxidation. This also results in a final product having a substantially lighter color. The zinc dust may be added in the same amounts as the catalyst i. e. about 1% of the total weight of the mixture. Other metals such as iron or tin or reducing agents such as sodium hydrosulfite or stannous chloride may be used.

After the reaction is complete the mixture is treated to remove excess alcohol and substantially all of the volatile alcohol esters formed during the reaction. This can be accomplished by distillation under vacuum. However, the removal of the excess alcohol can be readily accomplished by ordinary distillation. I prefer to remove the ester reaction products by vacuum distillation and it will be found that these materials have a substantially lower boiling point than the impurities from which they are derived. In an unobstructed path still and when methyl alcohol is used it has been found that the methyl ester reaction products distill at 90–140° C. at .5 to .015 mm. The tocopherol distillate is collected at 120°–200° C. at .003–.007 mm. However the tocopherol and the impurities can be removed at higher pressures such as .1 mm. or in ordinary vacuum stills, although thermal destruction is increased. Redistillation of a tocopherol distillate obtained in this way yields a product of exceptional purity and may be advantageous in some cases. However, redistillation is not necessary for most purposes.

*Example 1*

8 drums containing 400 lbs. each of "clabber stock" obtained as a scum from the hotwell of a vegetable oil steam deodorization plant were stirred with 100 lbs. of commercial hydrochloric acid (1.13 specific gravity) and about 20 lbs. of zinc dust This mixture was boiled and stirred for about 15 minutes. It was allowed to settle and the bottom acid layer was drained off. Water was added, the mixture boiled and the water layer drained off and the non-aqueous layer washed until free of mineral acid. The scum was then filtered to remove zinc dust and carbon present in the original material. This material having an acid value of about 100 and a tocopherol content of about 6.4% was introduced in a thin film into a degasser where it was heated to about 100° C. under a pressure of about .01 mm. The degassed material was then introduced into a multi-unit molecular still, the first unit of which was heated to a temperature of about 170° C. A fraction was removed of high acid value which was discarded. The undistilled residue was then treated in the second unit of the still which was heated to a temperature of about 180° C. The pressure was the same as the first unit, namely about 1 micron. The fraction removed in the second unit was returned to the material flowing into the first unit. The undistilled residue from the second unit was introduced into the third unit of the still which was at a temperature of about 200° C. The pressure was about 1 micron. A fraction containing about 15% tocopherol and containing oil impurities and having an acid value of about 20 was obtained.

Seven hundred grams of the above concentrate (acid value 26.7; per cent tocopherol 13.1) was heated with 2 volumes of methyl alcohol and 1% sulphuric acid for 1 hour at about 65–80° C. Cooling to 2° C. over night caused 105 g. (15%) of sterols to precipitate. This was filtered off, the methyl alcohol removed by distillation, at ordinary pressure and 68–100° C. and the residual oil washed twice with water. Distillation in a high vacuum, unobstructed path still then gave the following main fractions:

Fore run, 395 g.; tocopherol 2.2% 110–130°
2nd fraction, 142 g.; tocopherol 44.0% 140–190°

The second fraction had an acid value of 0.9. Calculation showed that 99.3% of the original free fatty acid and oil was removed by the procedure. The concentrate was red in color and suitable for redistillation to an improved tocopherol concentrate or esterification to prepare tocopherol acetate or palmitate.

*Example 2*

This example was carried out in the same manner as Example 1, except that 1% zinc dust was added with the methyl alcohol and sulfuric acid. The tocopherol distillate had a distinctly lighter color than that obtained as a final product in Example 1.

*Example 3*

Corn oil as removed from the expellor mill was heated with an equal volume of water to 50° C. to precipitate phosphatides which were then removed by settling and decantation. The oil was then degassed and subjected to distillation in a high vacuum, unobstructed path still at a pressure of about .003 to .005 mm. The first fraction was removed at 180° C. It represented 1/100% of the oil and contained large amounts of free fatty acids. This fraction was discarded. A second fraction was removed at 245° to 255° C. It represented 2.58% of the original oil and contained 2.9% tocopherol. This second fraction was reacted with methyl alcohol and refined in the same manner as described in the foregoing example, the proportions of reactants used being the same.

Removal of sterols as described above is advantageous if the starting material contains substantial amounts of these substances. This is particularly advantageous procedure in connection with starting materials derived from sludges and scums since rather large amounts of sterols are present. However, this procedure is in no way necessary because the sterols can be satisfactorily removed by the subsequent distillation and often are not present in harmful amounts.

What I claim is:

1. The process of preparing a relatively purified concentrate of tocopherol from crude materials which contain tocopherol and which are derived from the sludge, scum or like by-product produced during the carrier gas treatment of tocopherol containing vegetable oils, and which contain relatively large amounts of free fatty acids as impurities which process comprises adding an acid esterification catalyst and a lower aliphatic alcohol to the crude material, heating this mixture until the reaction is substantially complete, removing excess alcohol and then separating volatile reaction products including esters of the fatty acid impurities by vacuum distillation.

2. The process of preparing a relatively purified concentrate of tocopherol from materials which contain tocopherol and which are derived from the sludge, scum, or like by-product produced during the carrier gas treatment of tocopherol containing vegetable oils and which contain relatively large amounts of free fatty acids as impurities which process comprises adding a mineral acid catalyst and a member of the group consisting of methyl or ethyl alcohol to the crude material, heating this mixture until the reaction is substantially complete, removing excess alcohol, separating volatile reaction products by vacuum distillation and then further distilling under high vacuum, unobstructed path conditions and collecting a purified tocopherol distillate.

3. The process of preparing a relatively purified concentrate of tocopherol from crude materials which contain tocopherol and which are derived by high vacuum, unobstructed path distillation of the sludge, scum or like by-product produced during the carrier gas treatment of tocopherol containing vegetable oils and which contain relatively large amounts of free fatty acids as impurities which process comprises adding an acid esterification catalyst and a lower aliphatic alcohol to the crude material, heating this mixture until the reaction is substantially complete, removing excess alcohol and then removing separate fractions containing volatile reaction products including esters of the fatty acid impurities and tocopherol, by vacuum distillation.

4. The process of preparing a relatively purified concentrate of tocopherol from crude materials which contain tocopherol and which are obtained by distillation of the sludge scum or like by-product produced during the carrier gas treatment of tocopherol containing vegetable oils, and which contain relatively large amounts of free fatty acids as impurities which process comprises adding a mineral acid catalyst and a member of the group consisting of methyl or ethyl alcohol to the crude material, heating this mixture until the reaction between the alcohol and the impurities is substantially complete, removing excess alcohol by distillation and then separating the volatile reaction products and the tocopherol in individual fractions by vacuum distillation of the residue.

5. The process of preparing a relatively purified concentrate of tocopherol from crude materials obtained by the high vacuum, unobstructed path distillation of a vegetable or animal oil which contains tocopherol, and which contain relatively large amounts of free fatty acids as impurities which process comprises adding to the distillate a mineral acid catalyst and a lower aliphatic alcohol, heating this mixture until the reaction is substantially complete, removing excess alcohol, subjecting the residue to vacuum distillation and separating a fraction containing the reaction products of the lower aliphatic alcohol with the impurities and a fraction containing the tocopherol in relatively concentrated form.

6. The process of preparing a relatively purified concentrate of tocopherol from crude materials which contain tocopherol and which are derived from the sludge, scum or like by-product produced during the steam deodorization treatment of a vegetable oil which contains tocopherol, and which contain relatively large amounts of free fatty acids as impurities which process comprises adding an acid esterification catalyst, a reducing agent and a lower aliphatic alcohol to the crude material, heating until reaction between the alcohol and the impurities is substantially complete, removing excess alcohol and reaction products including esters and then separating a relatively pure concentrate of tocopherol from the residue by vacuum distillation.

7. The process of preparing a relatively purified concentrate of tocopherol which comprises in combination subjecting a sludge, scum, or like by-product derived from the carrier gas treatment of tocopherol containing vegetable oils to high vacuum, unobstructed path distillation, separating a fraction containing an increased amount of tocopherol and relatively large amounts of free fatty acids, adding to this fraction approximately two volumes of methyl alcohol and a small amount of sulfuric acid, cooling to about 2° to precipitate sterols, removing the precipitated sterols by filtering, heating the filtrate for approximately one hour to 65°–80° C., removing excess methyl alcohol by distillation, washing the residue with water and then subjecting it to high vacuum distillation to separate two fractions, the first containing methyl esters of impurities and the second containing tocopherol in concentrated form.

JAMES G. BAXTER.